April 30, 1946.
H. J. FRAMHEIN
2,399,596
PALLET TRUCK
Filed Feb. 25, 1942
3 Sheets-Sheet 1
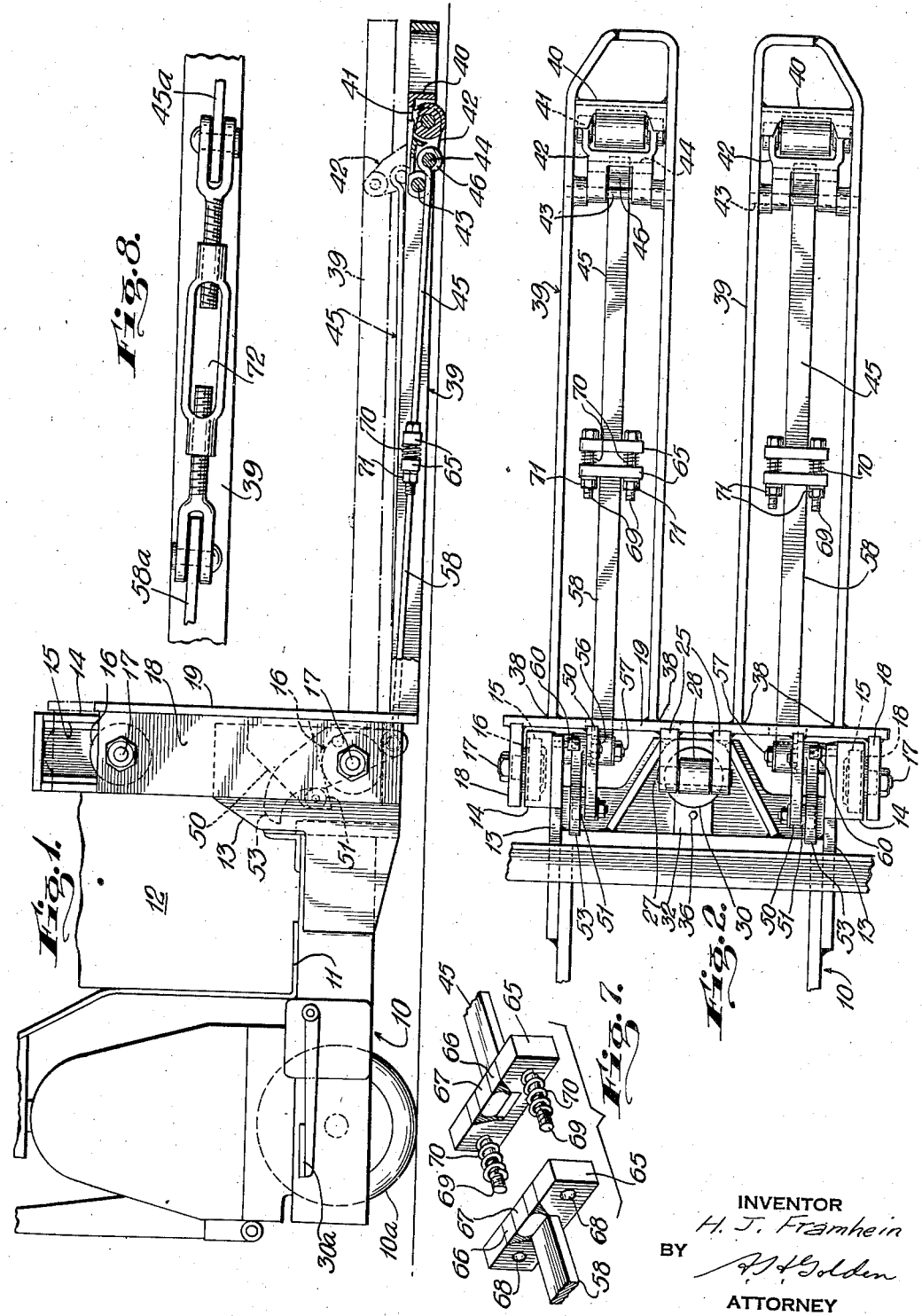
INVENTOR
H. J. Framhein
BY
ATTORNEY April 30, 1946. H. J. FRAMHEIN 2,399,596
PALLET TRUCK
Filed Feb. 25, 1942 3 Sheets-Sheet 2
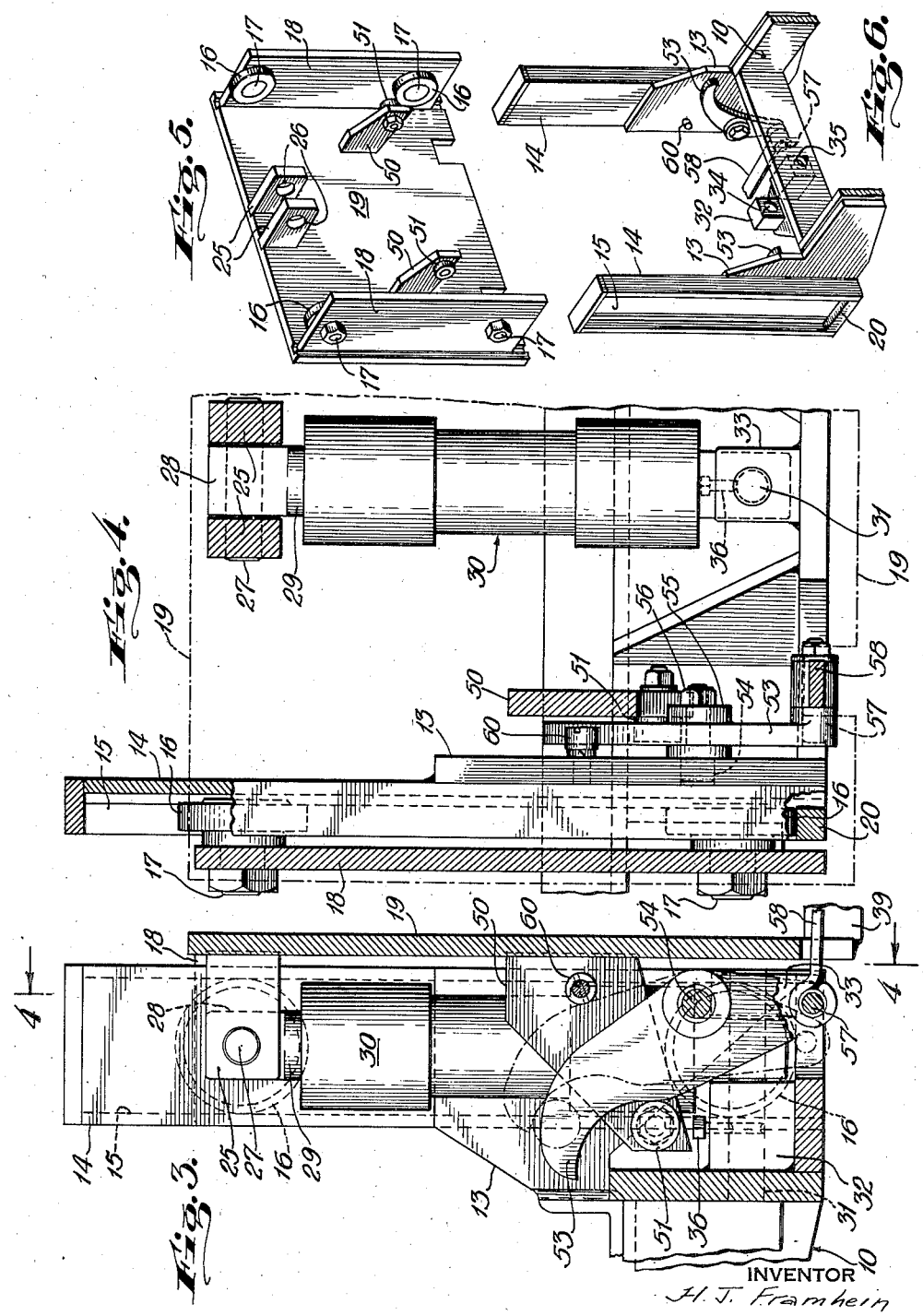

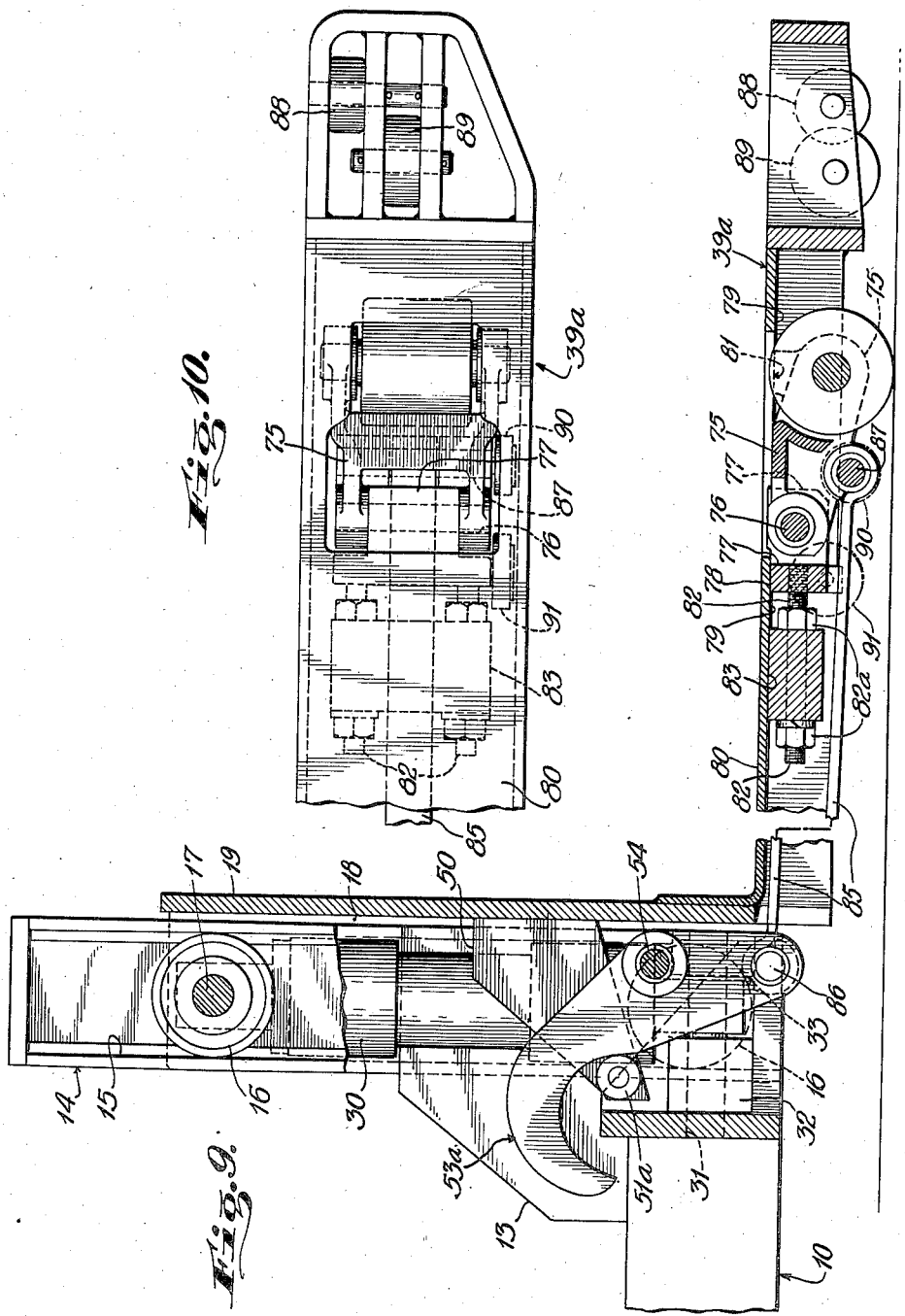

Patented Apr. 30, 1946

2,399,596

UNITED STATES PATENT OFFICE 2,399,596

PALLET TRUCK

Herbert J. Framhein, Chicago, Ill., assignor to The Yale & Towne Manufacturing Company, Stamford, Conn., a corporation of Connecticut Application February 25, 1942, Serial No. 432,177

5 Claims. (Cl. 254—2)

This invention relates to a lift truck of the type having an elevating platform that is adapted to be lifted relatively to a lifting head. More particularly, my invention relates to a lift truck of the type in which the elevating platform is supported by wheels at its rear end, and is adapted to be lifted at its forward end through lifting means extending between the lifting head and the elevating platform, the lifting movement of the platform at its forward end, being adapted through suitable means, to move the wheels at the rear end of the platform to elevate the rear end.

Trucks of the general description given are quite well known in the art, and one type is disclosed in the Hastings Patent No. 2,234,925 and in the Quayle Patent 2,274,164. In the Hastings and Quayle patents the elevating platform is pivotally mounted relatively to the lifting head, and when the forward end of the platform is elevated through pivotal movement relatively to the lifting head, linkage mechanism connected to the rear wheels of the platform is adapted to move those rear wheels to elevate the rear end of the platform simultaneously with the forward end.

The art also includes trucks in which a steering head carries a vertically movable steering wheel that may be moved vertically relatively to the truck platform to lift the forward end of that platform. In this type of truck, illustrated in the Hennessey Patent No. 1,359,372, the rear wheel supporting links are actuated by the movement of the steering wheel to lift the rear end of the elevating platform simultaneously with the lifting of the forward end of the platform. This type of truck does not utilize a lifting head and an elevating platform as outlined by Hastings and Quayle.

The truck of my invention utilizes a platform, which unlike that of the Hastings and Quayle patents, is mounted for vertical sliding movement relatively to a lifting head, the mounting means whereby the platform is mounted on the lifting head being utilized for maintaining the lifting head and the platform assembled to form a complete truck. More particularly, the mounting means whereby the platform moves vertically relatively to the lifting head, comprise rollers which are preferably mounted on the lifting platform and ride in the channels of uprights mounted on the lifting head. My truck varies from trucks such as the one shown in the Hennessey patent in that I utilize a lifting head as well as an elevating platform.

The vertical movement of the forward end of the elevating platform is employed to actuate means which are connected to the rear wheels of the elevating platform for moving those wheels relatively to the platform, as will be readily undertstood by those skilled in the art. The means whereby the rear wheels are actuated form a novel part of my invention, and comprise an operating member, preferably in the form of a cam, which is preferably pivotally mounted on the lifting head. This cam is adapted for movement on its mounting by means carried on the elevating platform, and the preferred form of my invention utilizes as the said means a roller mounted for movement with the elevating platform.

As a further feature of my invention, I utilize a roller and channel connection between the elevating platform and the lifting head for not only maintaining the platform and head assembled, but for limiting the downward movement of the platform relatively to the lifting head. As still a further feature of this portion of my invention, the rollers are adapted to limit vertical movement of the platform by cooperating with fixed portions of the standards in which are formed the channels in which the rollers move.

A further feature of importance in my invention, is the particular means utilized for connecting the actuating cams with the links on which the rear wheels of the platform are mounted. The particular means utilized are preferably in the form of adjustable rods, so that accurate adjustment may be had to place the rear links in proper operating relation to the platform while the cams are in proper operating relation to the lifting head and the means on the platform utilized for actuating the cams. It will of course be appreciated by those skilled in the art that while I utilize what I describe as cams, and preferably pivoted cams, other suitably mounted mechanism may be adapted for the purpose.

As a further feature of my invention I utilize rear wheels mounted on links which are adapted for adjustable movement relatively to the elevating platform, so as to facilitate the proper adjustment of the relationship between the wheel carrying links and the platform on the one hand, and the actuating cams on the other hand. Those skilled in the art will readily appreciate the value of this type of mechanism.

I have thus described my invention generally in order that the basic contribution of my invention may be better understood. Certain additional features to be described in the specification, form important parts of my invention and will be claimed broadly hereinafter. Since those skilled in the art will readily understand how my invention may be embodied in forms other than that which I shall herein describe, I believe it important that my patent claims shall be sufficiently broad to prevent the utilization of my contribution to the art in forms other than herein presented.

Referring now to the drawings, Fig. 1 is an elevation illustrating my invention applied to a motorized lift truck of the type described in my application, Serial No. 390,931 filed April 29, 1941, now Patent No. 2,327,583, dated August 24, 1943. Fig. 2 is a view looking downwardly on the truck of Fig. 1 illustrating my invention. Fig. 3 is a vertical section on the line 3—3 of Fig. 2 showing the means whereby the lifting movement of the elevating platform is utilized for imparting lifting movement to the rear wheels of the elevating platform. Fig. 4 is a section taken along line 4—4 of Fig. 3. Fig. 5 is a perspective view of the lifting platform standard adapted for cooperation with the standard of the lifting head. Fig. 6 is a perspective view of a portion of the lifting head showing the standard comprising a pair of uprights. Fig. 7 is a perspective exploded view of means utilized for adjusting the connection between the rear wheel supporting links of the platform and the operating mechanism for moving those links. Fig. 8 is a view of a modified form of means which may be utilized for the particular purpose.

Fig. 9 is a view similar to Fig. 1 but illustrating a somewhat different type of connection between the rear wheel supporting links and the actuating mechanism therefor, as well as a novel means for adjusting the position of the wheel supporting links. Fig. 10 is a view taken looking downwardly on the platform of Fig. 9.

Referring now more particularly to the drawings, the lifting head of my truck is designated generally by the reference numeral 10 and is of the same general type shown in my earlier application, Serial No. 390,931, filed April 29, 1941, now Patent No. 2,327,583, dated August 24, 1943. The lifting head 10 carries a battery support 11 in which is mounted a battery 12 which provides power for the propelling motor of the truck used to drive the wheel 10a that supports the lifting head 10. The construction of the forward end of the lifting head 10 is of no particular importance to this application and no further description thereof will be given.

As is best seen from Figs. 5 and 6, the rear end of the lifting head 10 has welded thereto a pair of gusset plates 13, and welded in turn to the plates 13 are the uprights 14, channeled at 15 to provide ways for the rollers 16. The rollers 16 are suitably mounted on pivot shafts 17 relatively to the plate portions 18 of the elevating platform standard 19. The mounting means for the rollers 16 are not shown in detail nor described in detail, they being constructed and mounted as is common in the lift truck art, and as is shown in numerous patents. The cooperation between the rollers 16 and the channels 15 of the uprights 14, is such that the elevating platform standard 19 will move vertically relatively to the uprights 14, and will be incapable of any pivotal movement relatively to those uprights, and therefore relatively to the lifting head 10. Therefore it may be said that the coaction between the rollers 16 and the uprights 14 forms an assembled truck having an elevating platform and a lifting head, and with the platform adapted for vertical movement on the lifting head and held against pivotal movement relatively to said lifting head.

The lower ends of the channels 15 of uprights 14 are closed by cross bars 20, and in the lowermost position of the elevating platform illustrated in Figs. 1, 3 and 4, the bottom rollers 16 will rest on the upper surfaces of the cross bars 20, thus limiting the downward movement of the elevating platform standard 19 relatively to the lifting head.

As may best be seen in Figs. 3, 4 and 5, the upper portion of the standard 19 carries a pair of lugs 25 which are bored at 26 for the passage of a short shaft 27. The shaft 27 is adapted to secure to the lugs 25 the upper end 28 of a ram 29 forming part of a hydraulic lifting assembly 30. The lower end of the hydraulic lifting assembly 30 is pivoted through a pin 31 relatively to a pair of lugs 32 and 33 suitably secured to the lifting head 10, as by welding. The lugs 32 and 33 are suitably drilled at 34 and 35 for the passage of the pin 31, the pin being itself retained against movement by a bolt 36 best illustrated in Fig. 4, and shown also in Fig. 3. Through the use of suitable pumping mechanism carried on the lifting head, and actuated by the treadle 30a, the ram 29 will be moved to impart lifting movement to the standard 19, with the standard 19 being suitably guided by the rollers 16 riding within the channels 15 as has already been set forth.

Those skilled in the art will readily appreciate that by reversing the uprights 14 so that the channels 15 will extend inwardly rather than outwardly, the width of the truck may readily be changed. They will further appreciate that by merely welding additional gussets, such as the gussets 13, relatively to the lifting head, the width of the truck may be further increased.

In the truck illustrated in Figs. 1 to 5, the elevating platform is of the U-shape type adapted for cooperation with a pallet. Each of the U-shape portions 39 is welded as at 38 to the standard 19 and extends rearwardly as is clearly shown in Fig. 2. Since the U-shaped portions 39 are identical, I shall describe the construction of but one of the said portions. Referring to Figs. 1 and 2, it will be noted than an angle member 40 is welded in transverse reinforcing relation to the U portion 39 for stiffening its construction, and for cooperation with surfaces 41 of a rear wheel supporting link 42. This rear wheel supporting link 42 is pivoted on the shaft 43 relatively to the U portion 39, and in the lowered position of the platform illustrated in Fig. 1, has its upper surfaces 41 lying against the angle member 40 to determine the lowermost position of the rear end of the platform of the truck. For rotating the link 42 to lift the rear end of the U portion 39 of the elevating platform, the link 42 is hinged at pin 44 to a flat tension rod 45 whose end portion 46 fits about the pin 44 in the manner of a hinge plate. The tension rod 45 extends forwardly toward the lifting head and the standard 19 of the elevating platform and is actuated as will be described shortly.

Referring now more particularly to Figs. 3, 4 and 5, it will be noted that at each side of the standard 19, and equally spaced from its center, is an arm 50, on the end of which is mounted a roller 51 which may be similar to the rollers 16, although preferably considerably smaller. Mounted on each of the gusset plates 13, which support the uprights 14, is what I choose to term an actuating cam 53. The cams 53 are preferably pivotally mounted relatively to the gusset plates 13 through stub shafts 54, and are held on the shafts 54 for pivotal movement through suitable washers 55 and nuts 56, all as will be quite apparent to those skilled in the art. Each of the operating cams 53 is pivotally connected through a pin 57 to a flat tension rod 58, the connection being the same as that between the rods 45 and the pins 44 of the rear wheel links 42.

The rods 45 and 58 are suitably connected by adjustable means to be described presently so that tension applied to the rods will rotate the links 42 about their shafts 43 to lift the rear ends of the pair of U-portions 39 comprising the elevating platform of my truck. This movement is applied to the rods by rotation of the operating cams 53 by the rollers 51 as the standard 19 of the elevating platform moves vertically through action of the ram 29 of the hydraulic lifting mechanism 30. The lowered position of the standard 19 is well illustrated in solid lines in Fig. 3, and the positions of the operating cams 53 and rollers 51 when the lifting platform is in its lowest position are there also shown in solid lines. The dash and dotted line position in Fig. 3 of a roller 51 and one of the actuating cams 53, illustrates the positions of the particular parts when the standard 19 has been elevated. It is obvious that when the operating cams 53 are rotated clockwise by rollers 51, they apply tension to the rods 58 and 45 to rotate the links 42. For limiting the movement of the operating cams 53, I use pins 60, which take the form of studs threaded into the gusset 13, as well illustrated in Figs. 3 and 4.

For economy in manufacture it is best to utilize the two rods 58 and 45 rather than a single rod. I have also found it best to utilize the two rods 58 and 45 for connecting each of the operating cams 53 with its particular wheel supporting link 42, in order that the operating relationship of Fig. 1 may readily be obtained without extremely accurate manufacture of the several parts. At this point, particular attention is called to the fact that the actuating cams 53 are mounted on the lifting head and are connected to the links 42 that are mounted on the elevating platform. This arrangement is most novel, and allows for the use of actuating cams that do not protrude below the elevating platform. One form of means for utilizing the two rods 45 and 58 is shown in Fig. 7 where the rods 45 and 58 are anchored at their ends relatively to bars 65 as by welding at 66, inserts 67 being utilized to provide a smooth finished surface to the bars.

Each of the bars 65 is bored as at 68 for the passage of bolts 69. Springs 70 are placed about the bolts 69 and lie between the bars 65 when the bolts are secured relatively to the bars 65 by the nuts 71 as is well illustrated in Fig. 7. It is obvious that by rotating the nuts 71 on the bolts 69, the effective length of the rods 58 and 45 may be accurately determined, the distance between the bars 65 being well taken up by the springs 70.

In Fig. 8 I show a modified form of the invention of Fig. 7, in which I utilize bars 45a and 58a, and connect the said bars by a turnbuckle assembly designated generally by reference numeral 72. It is quite obvious that through the use of the turnbuckle arrangement 72, the effective length of the two bars 58a and 45a may be readily determined.

Referring now more particularly to Figs. 9 and 10, I illustrate a form of my invention in which I use a form of rear wheel supporting link which is different from that illustrated in Figs. 1 to 8 inclusive. In the modification of Figs. 9 and 10 I use also a different type of connection between the rear wheel supporting links and the actuating cams 53 through which those links are actuated. Incidentally, in the form of my invention shown in Figs. 9 and 10, I show a slightly different form of actuating cam designated by reference numeral 53a. The remaining parts are the same as those illustrated in the first modification, and therefore bear the same reference numerals.

Referring now to Figs. 9 and 10, each of the rear wheel supporting links is designated by reference numeral 75 and is pivoted on shaft 76 relatively to a bearing block 77 whose upper surface bears against the under surface 79 of the inverted channel member 80 that forms one of the U portions 39a of the platform of the truck. Where an inverted channel is not utilized, it is obvious that other means will be provided so that the block 77 will slide relatively to the under surface of the platform, all as will be clearly understood by those skilled in the art.

Link 75 has a surface 81, which in the lowered position of the platform illustrated in Fig. 9, bears against the under surface 79 of the inverted channel 80 for limiting the downward movement of the rear end of the elevating platform, all as I have described with reference to my earlier modification. The block 77 is secured to a pair of bolts 82 which extend through parallel bores in a block 83 welded to the underside of the channel 80. It is obvious that by adjusting the positions of the bolts 82 relatively to the fixed block 83 and securing the bolts in said positions by nuts 82a, the bearing block 78 will be adjusted longitudinally of the elevating platform or inverted channel 80. In this way, a ready adjustment of the position of the rear wheel supporting link 75 is obtained. This position may be adjusted so that the several operating parts will be in a predetermined position when the platform is in its lowered position of Fig. 9, all as will be clearly understood by those skilled in the art.

A tension rod 85, which may be similar in form to the rods 45 and 58 of my first modification, is pivoted at 86 to the operating cam 53a as shown in Fig. 9, and through the pin 87 to the link 75, whereby the movement of the operating cam 53a by the roller 51a of the elevating platform, will rotate the link 75 to elevate the rear end of the platform as has already been indicated.

In pallet trucks, it is desirable that rollers be utilized for assisting the truck in entering between the floors of the pallet. In my truck of Figs. 9 and 10 I show such rollers at the rear end of the platform designated by reference numbers 88 and 89. I utilize an additional roller 90 mounted on the pin 87, and a fourth roller 91 mounted on the bearing block 77. The roller 90 has the additional function of protecting the pivoted connection between the rod 85 and the link 75 as is readily seen.

I believe the construction and operation of my invention will now be apparent to those skilled in the art.

I now claim:

1. In a truck of the class described, a lifting head, a wheel supporting said lifting head, an elevating platform, wheel supporting means at the rear end of said platform and movably mounted relatively thereto for lifting the rear end of said platform, means whereby the front end of said platform is mounted for vertical sliding movement on said lifting head and against pivotal movement relatively to said lifting head whereby to form with said lifting head a complete truck, means extending between the forward end of said platform and said lifting head for lifting the forward end of said platform relatively to said lifting head, a cam member pivotally mounted on said lifting head, a rod connecting said cam member with said wheel supporting means at the rear of said platform, a roller mounted on said platform and bearing against said cam member as the front end of said platform is lifted, whereby to rotate said cam member and through said rod actuate said wheel supporting means to lift the rear end of said platform, and a stop on said lifting platform against which said cam is moved by said roller.

2. In a truck of the class described, an elevating platform, a wheel supporting link pivoted to the rear end of said platform, actuating means for moving said wheel supporting link, a connecting rod for connecting said link to said actuating means pivoted at one end to said link and terminating at its other end short of the end of said actuating means, an adjustable connector connecting the end of said rod and the end of said actuating means and bridging the gap therebetween, and a spring pressing said ends away from one another to maintain said gap.

3. In a truck of the class described, an elevating platform, a wheel supporting link pivoted to the rear end of said platform, actuating means for moving said wheel supporting link, a connecting rod for connecting said link to said actuating means pivoted at one end to said link and terminating at its other end short of said actuating means, an adjustable bolt connecting said rod and said actuating means and bridging the gap therebetween, and a spring between said actuating means and said rod for yieldingly resisting movement of said rod toward said actuating means.

4. In a truck of the class described, an elevating platform, a wheel supporting link, a bearing on which said wheel supporting link is pivoted, the upper surface of said bearing lying against the under surface of the said platform for sliding movement on said under surface, and screw threaded means for adjusting the position of said bearing relatively to said surface.

5. In a truck of the class described, an elevating platform, a wheel supporting link, a bearing on which said wheel supporting link is pivoted, the upper surface of said bearing lying against the under surface of the said platform for sliding movement on said under surface, and means movable relatively to means fixed to said platform for adjusting the position of said bearing relatively to said surface.

HERBERT J. FRAMHEIN.